July 5, 1927.
C. J. DUNZWEILER ET AL
1,634,284
STORAGE BATTERY CONTAINER
Filed Aug. 3, 1923
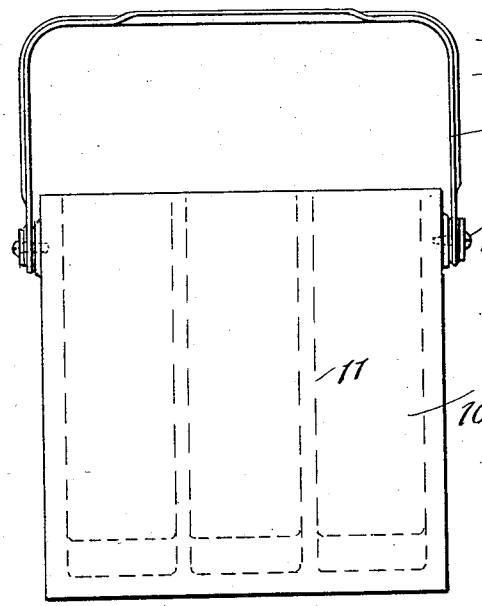
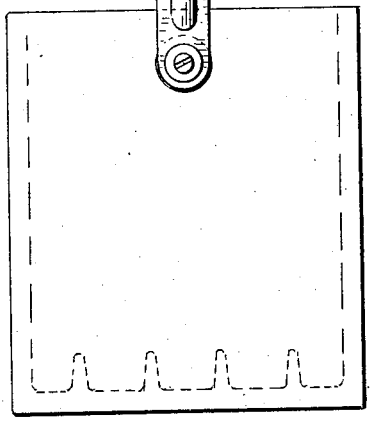
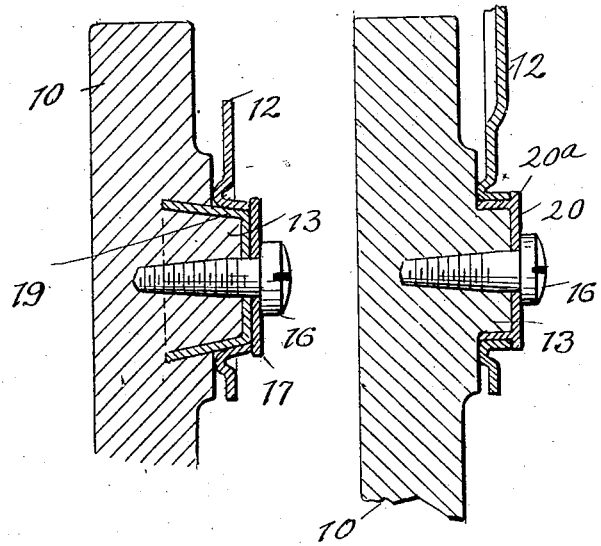
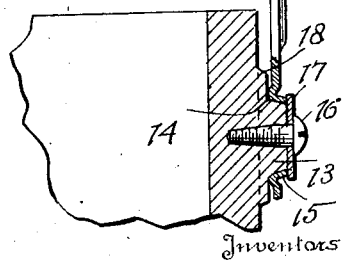
Inventors
Carl J. Dunzweiler
Malvern W. Severance
By Thurston Rice & Hudson
Attorneys Patented July 5, 1927.

1,634,284

UNITED STATES PATENT OFFICE.

CARL J. DUNZWEILER AND MALVERN W. SEVERANCE, OF CLEVELAND, OHIO, ASSIGNORS TO WILLARD STORAGE BATTERY COMPANY, OF CLEVELAND, OHIO, A CORPORATION OF WEST VIRGINIA.

STORAGE-BATTERY CONTAINER.

Application filed August 3, 1923. Serial No. 655,454.

This invention relates to storage battery containers and particularly to multiple compartment containers formed of hard rubber. More especially the invention relates to certain improvements in the handle connection for containers utilized with radio or other comparatively small batteries which can be conveniently provided with a handle in the form of a strap or bail pivotally connected to the ends of the container.

The object of the invention is to provide a handle connection which is strong and durable and able to at all times sustain the weight of the battery, the weight being supported by an integral part of the battery and substantially independently of any attaching screws.

The invention may be briefly summarized as consisting in certain novel details of construction, and combinations and arrangements of parts which will be described in the specification and set forth in the appended claim.

In the accompanying sheet of drawings, Fig. 1 is a side view of a storage battery container embodying our invention; Fig. 2 is an end view of the same; Fig. 3 is a detail sectional view showing the preferred way of attaching the handle to the container; and Figs. 4 and 5 are similar views showing slight modifications.

Referring now to the drawings, 10 represents a storage battery container such as that with which my invention has particular utility, this container having on the interior transverse partitions forming a series of separate compartments, one for each cell and being usually formed of hard rubber, constituting what is called a mono-bloc construction. The handle which is designed to be utilized with this container is shown at 12, this handle being preferably, though not necessarily, stamped from sheet metal, and being preferably reinforced by longitudinally extending pressed ribs to give it the necessary strength. As is apparent from Figs. 1 and 2, the handle is pivotally connected at its ends to the end walls of the container, the preferred way being shown in Fig. 3, and certain modifications in Figs. 4 and 5.

Due to the fact that hard rubber does not form an extremely good anchorage for screws, it is not desirable that the load be transmitted from the handle to the container by one or more fastening screws.

To provide a suitable connection which is adapted particularly for hard rubber, the handle is provided at its ends with openings which are caused to encircle bosses 13 provided on the end walls of the container near the top thereof and constituting integral portions of the container. These integral bosses may be tapered, but whether they are tapered or not, they are provided at their bases for the purpose of adding strength, with suitable fillets 14. The metal surrounding the openings of the handle which receive the bosses is suitably pressed outward as shown at 15 to form extended bearing surfaces, and if the bosses are tapered as shown in Fig. 3, and as is preferred, these extended bearing surfaces will have a corresponding taper. The ends of the handle are held onto the bosses 13 by screws 16 which are screwed centrally into the bosses, and by washers 17 whose diameter is slightly larger than the outer ends of the bosses. As very little, if any, strain is transmitted to these screws, there is no danger of their being pulled from the threaded sockets which receive them.

To keep the portions of the handle just above the bosses from rubbing against the ends of the container, the latter is preferably provided around each boss with a raised surface or pad 18, and to further increase the spacing effect, the bearing surface 15 of the handle may be extended inwardly as well as outwardly, as illustrated in the drawings.

In Fig. 3, as already stated, the handle bears directly on the surface of the hard rubber bosses. However, the bosses may, if desired, be encased with suitable metal caps. One way of doing this is illustrated in Fig. 4, where the bosses are surrounded by caps 19, the inner ends of which are embedded in the rubber. In this instance, as before, the extended bearing surfaces of the handle are prevented from slipping off of the bosses or their surrounding caps 19 by screws and washers.

In Fig. 5 the same idea is carried out in a somewhat different way, the cap here illustrated, and designated 20, having no part embedded in the rubber, but being designed to be slipped onto the boss 13. In this instance the cap and handle are held in place on the boss by a screw 16, but the washer is eliminated by providing on the outer end of the cap a handle retaining flange 20ª.

Any arrangement shown in Figs. 3, 4 and 5 may be employed, and while the caps may be employed to give additional strength to the handle support or connection, under ordinary circumstances the caps will not be needed as the bosses themselves have sufficient strength to support the load.

Having described our invention, we claim:

A storage battery container having a handle in the form of a bail attached to two opposite walls of the container, said walls having protruding pads and bosses projecting outwardly from the pads and formed integrally with the container walls, and the handle having laterally extended bearing portions surrounding the bosses, retainers secured on the ends of the bosses, the inner ends of the extended bearing portions adapted to engage the pads and the outer ends the retainers.

In testimony whereof, we hereunto affix our signatures.

CARL J. DUNZWEILER.
MALVERN W. SEVERANCE.